United States Patent Office 2,840,502
Patented June 24, 1958

2,840,502

FUNGICIDAL COMPOSITIONS

Joseph A. Lambrech, Charleston, W. Va., assignor to Union Carbide Corporation, a corporation of New York No Drawing. Application August 4, 1953
Serial No. 372,388

24 Claims. (Cl. 167—22)

This invention relates to new compositions of matter which are the metal and alkylamine salts, esters and sulfides of alkylaminomethylxanthic acids. These new materials are broadly useful in the arts but have been found to be particularly useful in the biological field, especially in the field of fungicides. In one aspect, therefore, the invention is particularly directed to fungicides wherein the materials of the present invention have the advantages of high effectiveness thereby providing fungicidal properties at relatively low cost, phytotoxicity which is so low that it is substantially non-existent at concentrations at which the materials are effective as foliage fungicides and wide application with respect to use. The invention also relates to compositions containing these new materials and to methods of combatting fungi, and more particularly to such practical, effective and low cost compositions and methods as may be used effectively on desirable plant life to prevent the growth of parasitic fungi and yet not have a deleterious effect upon the host either as a seed or while the plant is in foliage or at any other stage of growth.

The invention is also concerned with preparing and placing in the hands of the ultimate user, at a low cost, a fungicidal base material or concentrate which may be used for seed or soil or foliage treatment or from which the user may easily and quickly prepare an efficient water-base fungicide of low phototoxicity containing the contemplated toxicants as the active ingredient, and with the spray material thus prepared.

The compositions of matter or the materials which are the subject of the present invention and which can be used as low cost fungicides against fungi which attack a host plant either below or above the surface of the earth are stable derivatives of alkylaminomethylxanthic acids, for instance, said metal and alkylamino salts, esters and sulfides of an alkylaminomethylxanthic acid having a graphic formula

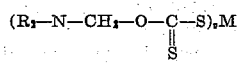

where "M" is a member of the group consisting of metals, for instance metals of the alkali group represented by sodium, and meals of groups I, II, VII and VIII of Mendeleeff's table represented by copper, zinc, manganese and iron and, as replacing the metals a radical of the formula $CH_2$—$N$—$R_2$,

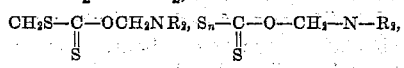

or $HN$—$R_2$; "$v$" is an integer not greater than the valence of M; "$n$" is an integer and "R" is an alkyl radical.

For practical purposes the least expensive metals will be used, that is iron will be used rather than the more expensive cobalt and nickel, copper rather than the more expensive silver, zinc rather than the more expensive magnesium, calcium, strontium, cadmium and barium, and manganese rather than the more expensive chromium, selenium, molybdenum or tungsten. Aluminum and tin may also be used as the metals but the metals first given, that is sodium, copper, zinc, manganese and iron operate well and cost little. The number of the alkylaminomethylxanthic radicals which occur in the compounds are usually and conveniently sufficient to satisfy the valence of "M," for instance "$v$" is 1, 2 or 3 depending upon whether "M" is, for instance, sodium, zinc or ferric iron. Where "M" is a radical of the formula

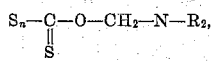

"$n$" may be an integer between 1 and 4. The alkyl radicals represented by "R" may run from methyl up through octyl, for instance 2-ethylhexyl, or the higher alkyl radicals; however to keep down costs, the less expensive radicals are preferred for instance "R" is preferably methyl, ethyl, or isopropyl.

These materials have been found to be more effective and of wider fields of use than similar materials which do not contain the amino-nitrogen, for instance, materials of the formula:

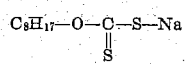

(sodium 2-ethylhexylxanthate).

It has been found that the materials of the present invention are fungicides of such high fungicidal activity and of such low phytotoxic effect on a living plant as to be useful in fungicidal sprays for those parts of the plant which are above the ground as well as in seed and soil treatments. They have an outstanding and unexpected combination of high fungicidal activity and low phytotoxic effect which combination of properties enables these materials to be used either as the sole or principal inhibitor or toxicant, or jointly with a wide variety of other inhibitors, or in any combination with or shortly after the use of a wide variety of insecticides and the like. The materials contemplated herein have such low phytotoxic activity that when used in the amounts necessary to inhibit fungi effectively they do not injure the host plant or seed or, stated in another manner, they have such a high fungistatic activity that they may be used in such small amounts as to cost relatively little and not injure the host plant yet inhibit the fungi.

Representative materials contemplated herein are the following.

Material No.:

1.—Sodium dimethylaminomethylxanthate

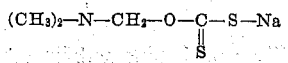

2.—Zinc bis(dimethylaminomethylxanthate)

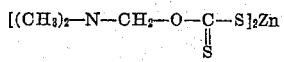

3.—Manganese bis(dimethylaminomethylxanthate)

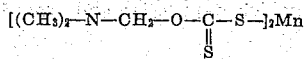

4.—Ferric dimethylaminomethylxanthate

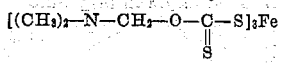

5.—Copper dimethyaminomethylxanthate

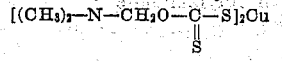

6.—Bis(dimethylaminomethylxanthogen) disulfide

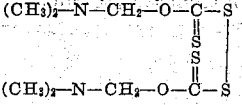

7.—Bis(dimethylaminomethylxanthogen) trisulfide $(CH_3)_2-N-CH_2-O-\underset{\underset{S}{\|}}{C}-S-S-S-\underset{\underset{S}{\|}}{C}-O-CH_2-N-(CH_3)_2$ 8.—Bis(dimethylaminomethylxanthogen) tetrasulfide $(CH_3)_2-N-CH_2-O-\underset{\underset{S}{\|}}{C}-S-S-S-S-\underset{\underset{S}{\|}}{C}-O-CH_2-N-(CH_3)_2$ 9.—Methanebis(dimethylaminomethyl)xanthate $(CH_3)_2-N-CH_2-O-\underset{\underset{S}{\|}}{C}-S-CH_2-S-\underset{\underset{S}{\|}}{C}-O-CH_2-N-(CH_3)_2$ 10.—Ethanebis(dimethylaminomethyl)xanthate $(CH_3)_2-N-CH_2-O-\underset{\underset{S}{\|}}{C}-S-CH_2-CH_2-S-\underset{\underset{S}{\|}}{C}-O-CH_2-N-(CH_3)_2$ 11.—Dimethylamine dimethylaminomethylxanthate $(CH_3)_2-N-CH_2-O-\underset{\underset{S}{\|}}{C}-SH.HN-(CH_3)_2$ 12.—Ethylenediamine bis(dimethylaminomethylxanthate)

$(CH_3)_2-N-CH_2-O-\underset{\underset{S}{\|}}{C}-SH.H_2N-CH_2-CH_2-NH_2.HS-\underset{\underset{S}{\|}}{C}-O-CH_2-N-(CH_3)_2$ 13.—Morpholine dimethylaminomethylxanthate $O\begin{array}{c}CH_2-CH_2\\ \\ CH_2-CH_2\end{array}NH.HS-\underset{\underset{S}{\|}}{C}-O-CH_2-N-(CH_3)_2$ 14.—Dimethylaminomethyl dimethylaminomethylxanthate $(CH_3)_2-N-CH_2-O-\underset{\underset{S}{\|}}{C}-S-CH_2-N(CH_3)_2$ 15.—Sodium diethylaminomethylxanthate $(C_2H_5)_2-N-CH_2-O-\underset{\underset{S}{\|}}{C}-S-Na$ 16.—Ferric diethylaminomethylxanthate $[(C_2H_5)_2-N-CH_2-O-\underset{\underset{S}{\|}}{C}-S]_3Fe$ 17.—Bis(diethylaminomethylxanthogen)disulfide $(C_2H_5)_2-N-CH_2-O-\underset{\underset{S}{\|}}{C}-S-S-\underset{\underset{S}{\|}}{C}-O-CH_2-N-(C_2H_5)_2$ 18.—Sodium diisopropylaminomethylxanthate $(C_3H_7)_2-N-CH_2-O-\underset{\underset{S}{\|}}{C}-S-Na$ 19.—Ferric diisopropylaminomethylxanthate $[(C_3H_7)_2-N-CH_2-O-\underset{\underset{S}{\|}}{C}-S]_3Fe$ 20.—Bis(diisopropylaminomethylxanthogen) disulfide $(C_3H_7)_2-N-CH_2-O-\underset{\underset{S}{\|}}{C}-S-S-\underset{\underset{S}{\|}}{C}-O-CH_2-N-(C_3H_7)_2$ Derivatives of xanthic acid (other than those contemplated herein) which were tested and proved to be unsatisfactory are Material No.:
30.—Potassium methylxanthogenate $CH_3-O-\underset{\underset{S}{\|}}{C}-S-K$ 31.—Sodium butylxanthate $C_4H_9-O-\underset{\underset{S}{\|}}{C}-S-Na$ 32.—Sodium chloroethylxanthate $Cl-CH_2-CH_2-O-\underset{\underset{S}{\|}}{C}-S-Na$ 33.—Sodium 2-ethylhexylxanthate $C_8H_{17}-O-\underset{\underset{S}{\|}}{C}-S-Na$ 34.—Zinc allylxanthate $(CH_2=CH-CH_2-O-\underset{\underset{S}{\|}}{C}-S)_2Zn$ 35. Zinc methylxanthate $(CH_3-O-\underset{\underset{S}{\|}}{C}-S)_2Zn$ 36.—Zinc 2,2,2-trichloroethylxanthate $(Cl_3-C-CH_2-O-\underset{\underset{S}{\|}}{C}-S)_2Zn$ 37.—Sodium dodecylxanthate $C_{12}H_{25}O-\underset{\underset{S}{\|}}{C}-S-Na$ 38.—Sodium isopropylxanthate $(CH_3)_2-CH-O-\underset{\underset{S}{\|}}{C}-S-Na$ 39.—Sodium propylxanthate $CH_3-CH_2-CH_2-O-\underset{\underset{S}{\|}}{C}-S-Na$ The materials contemplated herein may be made in the following manner:

EXAMPLE 1

Material No. 1, sodium dimethylaminomethylxanthate, was prepared from dimethylaminomethanol, carbon disulfide and sodium hydroxide. The dimethylaminomethanol was prepared by slowly adding 167 parts (all parts by weight) of 36% formalin solution to 280 parts of a 32% solution of dimethylamine in water at 10° C. After the addition of the formalin, the mixture was stirred for one hour at 10° C. and 300 parts of potassium carbonate were added over a space of 30 minutes. Instead of 10° C. a low temperature of 0° C. or lower may be used but temperatures below 10° C. are undesirable because they are unnecessary and increasingly impracticable the lower they are. Also temperatures up to 20° C. may be used but higher temperatures are undesirable because of decomposition. Instead of stirring for one hour, the stirring times may run from 30 minutes to 4 hours, or until the dimethylaminomethanol separates as the upper layer. The alcohol was separated from the salt solution in a separatory funnel and was used in making the xanthate without further purification.

The second step involved the addition of 40 parts of sodium hydroxide dissolved in 100 parts of water to 75 parts of dimethylaminomethanol. While maintaining this mixture at 25° C. (or within the range from 10° C. to 30° C.), 76 parts of carbon disulfide were gradually added over a space of one hour. After the addition of the carbon disulfide, the reaction mixture was stirred for two hours (or from 30 minutes to 4 hours) at 25° C. or within the temperature range previously stated. Then 200 parts of acetone were added, resulting in the precipitation of the sodium dimethylaminomethylxanthate. The solid xanthate was filtered off, washed with acetone and air dried, resulting in a white crystalline completely water soluble solid with a melting point of 110° C. These reactions can be illustrated as follows:

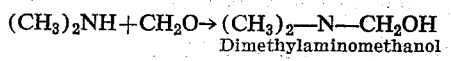
Dimethylaminomethanol

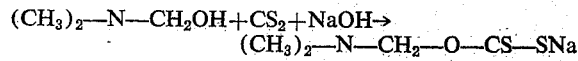

EXAMPLE 2

Material No. 2, zinc bis(dimethylaminomethylxanthate), was prepared by dissolving 34.6 parts of sodium dimethylaminomethylxanthate in 250 parts of water and adding thereto a solution made of 28.7 parts of hydrous zinc sulfate ($ZnSO_4.7H_2O$) and 300 parts of water at 25° C. The temperature range may be that of Example 1 and the stirring was continued until no more precipitate was thrown out of solution. The white solid precipitate which separated was filtered off, washed with water and air dried. The product melted at 250° C. and had a water solubility of less than 2%. This reaction proceeds as follows:

$2(CH_3)_2$—N—$CH_2$O—CS—SNa+$ZnSO_4.7H_2O$→
　　　　[$(CH_3)_2$—N—$CH_2$—O—CS—S]$_2$Zn

EXAMPLE 3

Material No. 3, manganese bis(dimethylaminomethylxanthate), was prepared by adding a solution made by dissolving 338 parts of anhydrous manganous sulfate in 1500 parts of water to a solution of 750 parts of sodium bis(dimethylaminomethylxanthate) dissolved in 5000 cc. of water at 25° C., with agitation. Temperatures within the range given in Example 1 may be used and agitation is continued until no more precipitate is formed. The yellow solid product which precipitated was filtered off, washed with water and air dried; it had a melting point above 270° C. and a water solubility of less than 2%. The reaction proceeded as in the case of Example 1.

EXAMPLE 4

Material No. 4, ferric dimethylaminomethyl xanthate, was prepared by adding a solution made of 270 parts of anhydrous ferric chloride and 1000 parts of water to a solution of 519 parts of sodium dimethylaminomethylxanthate and 5000 parts of water at 20° to 25° C. with agitation. The temperature range may be within that given in Example 1 and agitation is continued until no more precipitate is thrown out of solution. The dark brown solid precipitate which separated was filtered off, washed with water and air dried; it melted above 270° C. and had a water solubility of less than 2%. This reaction proceeds as follows:

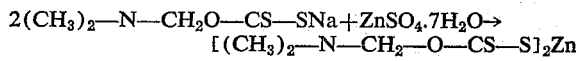

EXAMPLE 5

Material No. 5, copper dimethylaminomethylxanthate, was prepared by adding a solution made by dissolving 20 parts of anhydrous cupric sulphate ($CuSO_4$) in 500 parts of water to a solution of 43 parts of sodium dimethylaminomethylxanthate in 500 parts of water at 20° to 25° C. with agitation. The temperature range may be that stated in Example 1 and the agitation was continued until no more precipitate was thrown out of solution. The reddish brown solid which precipitated was filtered off, washed with water and air dried; it melted above 275° C. and had a water solubility of less than 2%. The reaction proceeded in the manner stated in Example 2.

EXAMPLE 6

Material No. 6, bis(dimethylaminomethylxanthogen) disulfide, was prepared by adding a mixture of 1196 parts of dilute sulfuric acid (16%) and 230 parts of 30% hydrogen peroxide in 1000 parts of water to a solution made of 692 parts of sodium dimethylaminomethylxanthate in 1000 parts of water at 20° C. with agitation. The temperature range may be that specified in Example 1 and the agitation continued until the precipitate ceases to be thrown out of solution. The yellow solid which precipitated was filtered off, washed with water and air dried; it melted at 150° C. and was soluble in water to the extent of less than 1%. The reaction proceeds as follows:

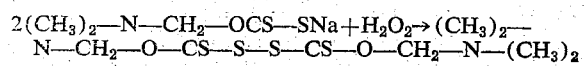

EXAMPLE 7

Material No. 7, bis(dimethylaminomethylxanthogen) trisulfide, was prepared by adding a mixture of 206 parts of sulfur dichloride and 206 parts of hexane to a solution of 692 parts of sodium dimethyl aminomethylxanthate in 820 parts of water with agitation. The temperature may be within the range specified in Example 1 and agitation is continued until the yellow solid precipitate ceases to be thrown out of solution. The product was filtered off, washed with water and air dried; it melted at 117° C., and had a water solubility of less than 1%. The reaction proceeds as follows:

$2(CH_3)_2$—N—$CH_2$—O—CS—SNa+$SCl_2$→
　$(CH_3)_2$—N—$CH_2$—O—CS—S—S—S—CS—
　　　　　　　　　　　　O—$CH_2$—N—$(CH_3)_2$

EXAMPLE 8

Material No. 8, bis(dimethylaminomethylxanthogen) tetrasulfide, was prepared directly from the starting materials without isolating intermediates. To 337 parts of formalin, 440 parts of dimethylamine were added at 20° C. over a space of one hour. The reaction is exothermic and is maintained by external cooling within a temperature range of from 10° C. to 30° C., 20° C. being preferred. After the addition of the dimethylamine, the mixture was agitated for one hour although the agitation period may be from 30 minutes to 4 hours. A solution of 160 parts of sodium hydroxide and 160 parts of water was added at 15° to 20° C., or within the range of from 10 to 30° C. This mixture was agitated until well mixed, in the present case 15 minutes, and then 264 parts of carbon disulfide were added over a space of one hour. After the addition of the carbon disulfide the mixture was stirred until thoroughly mixed, in this case for 30 minutes, at a temperature from 10 to 30° C., in this case 20° C. While maintaining the resulting mixture within the range from 10 to 30° C., in this case 15° C., a mixture of 270 parts of sulfur monochloride and 270 parts of hexane was added over a space of one hour. The reaction is exothermic and external cooling is necessary to maintain the reaction mixture at the desired temperature. Agitation was continued until no more of the yellow solid precipitate separated. The precipitate was filtered off, washed with water and air dried; it melted at 165° C. and had a water solubility of less than 1%. This reaction may be illustrated as follows:

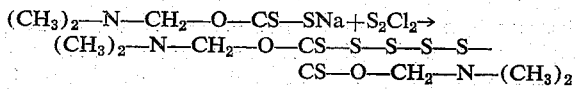

EXAMPLE 9

Material No. 9, methane bis(dimethylaminomethyl)-xanthate was prepared by adding 100 parts of 18% hydrochloric acid to a mixture of 86 parts of sodium dimethylaminomethylxanthate, 20 parts of 36% formalin solution and 300 parts of dioxane at 25° C. The reaction is slightly exothermic so that cooling with cold water is necessary to maintain the temperature at 25° C. After the addition of the hydrochloric acid, the reaction mixture was slowly heated to 75° C. and maintained at 75° C. for three hours. The mixture was then cooled at 25° C. and diluted with 1000 parts of water. The oil which separated as a lower layer was removed and the water layer was extracted with 200 parts of benzene. The benzene was removed by distillation and the product was heated to 35° C. at 5 mm. The methane bis-(dimethylaminomethylxanthate) is a clear amber colored liquid. It is less than 1 percent water soluble and has a specific gravity of 1.1014 25°/20° C.

This reaction can be conducted at lower temperatures but it is preferred to operate at 25° C. to 35° C. Above 35° C. some decomposition occurs.

EXAMPLE 10

Material No. 10, ethane bis(dimethylaminomethylxanthate) was prepared by slowly adding 25 parts of ethylene dichloride to a mixture of 86 parts of sodium dimethylaminomethylxanthate and 300 parts of isopropanol at 40° C. After the addition of the ethylene dichloride, the reactants were heated to 65° C. At this point the reaction was exothermic and it was necessary to cool with water to maintain the temperature between 65° C. and 70° C. The reaction mixture was maintained at 65° C. for two hours. The solid product which separated on cooling was filtered, washed with water and air dried at room temperature. The product is a pale yellow crystalline solid which melts at 180° C. to 182° C. It is less than 1 percent water soluble and has a mild onion-like odor.

EXAMPLE 11

Material No. 11, dimethylamine dimethylaminomethylxanthate, was prepared by adding a mixture of 27 parts of concentrated hydrochloric acid and 100 parts of water to a mixture of 52 parts of sodium dimethylaminomethylxanthate, 100 parts of water and 200 parts of benzene at 10 to 15° C. After the addition of hydrochloric acid, the benzene layer was separated from the brine solution and dried with sodium sulfate. A mixture of 13.5 parts of dimethylamine in 100 cc. of dioxane was slowly added to the benzene extract at 15° to 20° C. The product precipitated during the addition of the amine. After the addition of the amine 400 parts of hexane was added. The product was isolated by filtration, washed with hexane and air dried. It has a melting point of 128° to 129° C. and is more than 20 percent soluble in water.

EXAMPLE 12

Material No. 12, ethylenediamine bis(dimethylaminomethylxanthate), was prepared by adding a mixture of 50 parts of concentrated hydrochloric acid (36%) and 100 parts of water to a mixture of 86 grams of sodium dimethylaminomethylxanthate, 200 parts of water and 250 parts of benzene at 15° to 20° C. The reaction is exothermic so that it was necessary to cool with cold water to maintain the temperature at 15° to 20° C. The benzene layer was removed from the brine and dried over sodium sulfate. To this benzene solution of dimethylaminomethylxanthic acid, a mixture of 15 parts of ethylenediamine and 100 cc. of benzene was added at 20° to 25° C. After the addition of the ethylene diamine, 210 parts of a 95% isopropanol was added. The yellow crystalline solid which separated was filtered, washed with isopropanol and air dried at 25° C. The product was a yellow solid more than 20 percent soluble in water and melted at 106° to 109° C.

EXAMPLE 13

Material No. 13, morpholine dimethylaminomethylxanthate, was prepared by adding a mixture of 50 parts of concentrated (36%) hydrochloric acid and 100 parts of water to a mixture of 86 parts of sodium dimethylaminomethylxanthate, 200 parts of water and 250 parts of benzene at 15° to 20° C. The temperature was maintained at 15° to 20° C. by cooling with water. The benzene layer was removed from the brine and dried over sodium sulfate.

A solution of 43 parts of morpholine and 100 parts of benzene was added to the benzene extract of dimethylaminomethylxanthic acid at 20° to 25° C. The product which precipitated was filtered, washed with hexane and air dried at 25° C.

This product was a white crystalline solid which is more than 20 percent water soluble and melted at 162° to 165° C.

EXAMPLE 14

Material No. 14, dimethylaminomethyl dimethylaminomethylxanthate was prepared by adding 42 parts of 36% formalin to 63 parts of 37% dimethylamine in water and 300 cc. of dioxane at 20° C. The reaction was slightly exothermic so that cooling was necessary. Then 86 parts of sodium dimethylaminomethylxanthate was added to the above reaction mixture and a solution containing 50 parts of concentrated hydrochloric acid and 50 parts of water was slowly added at 25° C. This reaction was exothermic so that it was necessary to cool the reaction to maintain the temperature at 25° C. After the addition of the hydrochloric acid the mixture was heated at 75° C. for three hours. Approximately 1.0 liter of water was added. The oil layer was separated and the water layer extracted with benzene. The oil layer and the benzene extract were combined and the benzene removed by distillation up to a kettle temperature of 60° C. at 3 mm. pressure. The dimethylaminomethyl dimethylaminomethylxanthate was a brown liquid which had a specific gravity of 1.144 20°/20° C. and a refractive index $M_D^{30}$ 1.600. It was approximately 15% soluble in water.

The following materials were prepared in accordance with one or another of the foregoing examples as indicated below, using equimolar weights of reactants.

EXAMPLE 15

Material No. 15, sodium diethylaminomethylxanthate, was prepared according to Example 1 using diethylaminomethylxanthate instead of dimethylaminomethylxanthate. The product was a white crystalline solid, with a melting point of 90° C. and complete solubility in water.

EXAMPLE 16

Material No. 16, ferric diethylaminomethylxanthate, was prepared according to Example 4 replacing the dimethylaminomethylxanthate with diethylaminomethylxanthate. The product was a brown crystalline solid with a melting point of 246° C. and a water solubility of less than 2%.

EXAMPLE 17

Material No. 17, bis(diethylaminomethylxanthogen) disulfide, was prepared according to Example 6 replacing the dimethylaminomethylxanthate with diethylaminomethylxanthate. The product was a yellow crystalline solid with a melting point of 78° C. and a water solubility of less than 2%.

EXAMPLE 18

Material No. 18, sodium diisopropylaminomethylxanthate, was prepared according to Example 1 replacing the dimethylaminomethylxanthate with diisopropylaminomethylxanthate. The product was a white crystalline solid having a melting point of 92° C. and complete water solubility.

EXAMPLE 19

Material No. 19, ferric diisopropylaminomethylxanthate, was prepared according to Example 4 replacing the dimethylaminomethylxanthate with diisopropylaminomethylxanthate. The product was a brown crystalline solid with a melting point of 258° C. and a water solubility of less than 2%.

EXAMPLE 20

Material No. 20, bis(diisopropylaminomethylxanthogen) disulfide, was prepared according to Example 6 replacing the dimethylaminomethylxanthate with diisopropylaminomethylxanthate. It was a yellow crystalline solid with a melting point of 110° C. and a water solubility of less than 17%.

Following are descriptions of certain tests to which representative materials contemplated herein as well as other xanthates were subjected. Results are given which clearly show the greater effectiveness and usefulness of the alkylaminoxanthates herein contemplated. It is shown that the fungicides contemplated herein have the combined virtues of a high order of fungicidal effectiveness and a low order of toxicity to plants on which they may be sprayed. These properties combined with low cost make these materials very useful fungicides.

*Phytotoxicity test.*—In making the tests reported as "Phytotoxicity Test" in Tables 1 and 2 growing bean, corn, and tomato plants about 21 days old were used. The bean plants were about 12 inches high with several pairs of fully expanded trifoliate leaves, the corn plants about 12 inches high with 5 to 7 leaves, and the tomato plants about 8 to 10 inches high with 4 to 6 leaves. These plants were sprayed, until the leaves were wet, with aqueous sprays containing 99 parts by weight of water and 1 part of the respective chemicals listed in the tables. The treated plants were then placed in the greenhouse. The phytotoxicity ratings given in the three left hand columns of Tables 1 and 2 represent the conditions of the treated plants on the seventh day after spraying. The interpretation of the rating system used is as follows:

A _____ No injury.
B _____ Slight injury.
C _____ Moderate injury.
D _____ Severe injury.
E _____ Plant dead.

The purpose of the test was to determine the effect on foliage of contact with the several chemicals.

The spraying methods and equipment used are explained in more detail in an article entitled "A greenhouse method of evaluating fungicides by means of tomato foliage diseases," by S. E. A. McCallan and R. H. Wellman, Contributions Boyce Thompson Institute, vol. 13, pages 93–135, 1943.

*Tomato foliage disease tests.*—The object of these tests was to determine the efficacy of the chemicals in preventing attack opon the tomato plant by the fungus *Alternaria solani* which causes a disease commonly called early blight and by the fungus *Phytophthora infestans* which commonly causes a disease known as late blight. Both of these diseases also occur on potatoes, the latter being particularly destructive on potatoes in most of the areas where this crop is grown. The early blight disease is more commonly found on tomatoes and is frequently very destructive. Because the tomato plant is more easily and quickly grown under greenhouse conditions than the potato, it was chosen for these tests.

In orientation tests aqueous suspensions containing 0.2 and 0.04 part of the chemical under test in 100 parts (by weight) of water were prepared. Individual tomato plants were sprayed for 30 seconds with one or another of the suspensions or solutions thus prepared. Check or control plants were not sprayed. As soon as the spray dried (usually about two hours after application) each plant was inoculated with the spores of either *Alternarid solani* or *Phytophthoria infestans;* thus at least two plants were sprayed with each concentration of chemical and, after drying, one plant was inoculated with spores of *Alternaria solani* and one with spores of *Phytophthora infestans*.

All of the plants, including the control plants which receive no fungicidal spray, were subjected to 100% humidity in closed chambers maintained at approximately 72° F. in the case of early blight and 62° F. in the case of late blight, these being the optimum temperatures for the development of the respective diseases. The plans were held in the chambers for about 24 hours to allow infection to take place and were then removed to a greenhouse where disease readings were taken about three days later. The figures in Tables 1 and 2 under the heading Tomato Foliage Disease Test, subheadings E. B. and L. B. represent the percentage of lesions on the leaves of the plants sprayed with chemical, considering the number of lesions on the unsprayed or control plants as a hundred percent. Each figure is the average of the results of at least two such tests.

The method of test is more fully explained in an article by McCallan and Wellman appearing in Contributions Boyce Thompson Institute, volume 13, pp. 93–134, 1943.

Table 1.—*Phytotoxicity and fungicidal effectiveness of alkyl xanthates*

| Number | Phytotoxicity | | | Tomato Foliage Disease Test | | | |
| --- | --- | --- | --- | --- | --- | --- | --- |
| | | | | E. B. | | L. B. | |
| | Bean | Corn | Tomato | 0.2 | 0.04 | 0.2 | 0.04 |
| 30 | E | C | E | (¹) | 42 | (¹) | (¹) |
| 31 | E | C− | E | 36 | 88 | 74 | 81 |
| 32 | B | A | A | 54 | 100 | 65 | 100 |
| 33 | D | C | C | 41 | 82 | 11 | 57 |
| 34 | A | A− | A | 49 | 79 | 79 | 98 |
| 35 | C | C− | C | 45 | 83 | 78 | 93 |
| 36 | B | C | B | 28 | 90 | 68 | 52 |
| 37 | B | C+ | B | 82 | 100 | (¹) | 59 |
| 38 | B | D | D− | (¹) | 26 | (¹) | 49 |
| 39 | D | D− | D− | 37 | 86 | 100 | 90 |

¹ There was sufficient chemical injury to prevent accurate count being made of disease lesions.

*Table 2.—Phytotoxicity and fungicidal effectiveness of alkylaminomethyl xanthates*

| Number | Phytotoxicity | | | Tomato Foliage Disease Test | | | |
|---|---|---|---|---|---|---|---|
| | | | | E. B. | | L. B. | |
| | Bean | Corn | Tomato | 0.2 | 0.04 | 0.2 | 0.04 |
| 1 | B | A | B | 4 | 9 | 0 | 1 |
| 2 | A | A | A | 0 | 4 | 0 | 2 |
| 3 | A | A | B | 3 | 14 | 5 | 5 |
| 4 | A | A | A | 13 | 26 | 2 | 15 |
| 15 | B | A | B | 2 | 26 | 0 | 7 |
| 18 | A | A | B | 3 | 17 | 31 | 47 |
| 19 | A | B | A | 1 | 21 | 22 | 50 |

The results of these tests show that the alkylaminomethyl zanthates of Table 2 combine effective fungicidal action with a large margin of safety when applied to the foliage of plants. In contrast, the more simple alkyl xanthates of Table 1 are generally lacking in effectiveness as foliage fungicides and furthermore are quite phytotoxic.

The usefulness of the fungicides herein contemplated is further illustrated by the results summarized in Tables 3, 4 and 5. In Table 3 the data included under the heading "Tomato Disease Test" were obtained by fitting a straight line by eye to the data from at least three separate tests conducted in the manner previously described, the data being plotted on logarithmic probability paper. The weight percent of chemical required to give 80% disease control was obtained from the fitted curve. Consequently, the smaller the figure in the columns headed E. B. and L. B. the more effective is the chemical.

Other tests, the results of which are shown in Table 3 were conducted as follows:

*Snapdragon rust test.*—This test was conducted in the same way that the Tomato Foliage Disease Test was conducted, except that growing snapdragon plants (*Antirrhini majis*) were used and spores of *Puccinia antirrhini* were sprayed on the plants. Results of a number of tests conducted in a uniform fashion are shown under the heading "Snap Rust" in Table 3. Results are expressed as the percent disease resulting when snap dragon plants were sprayed with the concentration of chemical in weight percent shown in the heading, based on the amount of disease on the control plants as 100 percent. This test method is more fully described in an article by S. E. A. McCallan appearing in Contributions Boyce Thompson Institute, volume 13, pages 367–383, 1944.

*Seed protectant test.*—In this test seeds were tumbled in a rotating jar with the fungicide in order to distribute the fungicide evenly over the seed, the weight of the fungicide being 0.25% of the weight of the seed treated. After 30 minutes of tumbling, the jars were taken off the roller and the seed planted in rows in small wooden flats containing soil known to be infected with a group of fungi which together cause the disease known as "damping-off." Each flat was marked off into six rows, each row receiving ten seeds all treated with the same chemical. The controls were the same number of untreated seeds planted in the same soil. All treatments were randomized so that the order of occurrence of the treatments in each flat was entirely the result of chance. After planting, the flats were uniformly watered and placed in a dark room controlled to give a temperature of 5° C. These conditions simulate those occurring in nature under which "damping-off" is known to be most destructive. After seven days in this cold room the flats were removed to the greenhouse bench and counts were made one week later of the number of vigorous pea and corn plants emerging from the infested soil. At this time the plants were about one inch tall. In Table 3 under the heading "Seed Protectant Test" are given the figures showing the percentages of peas and corn emerging on the basis of the number planted. The controls, as previously stated, received no chemical treatment but otherwise were subjected to the same procedure as was given to the treated seeds.

This test method is more fully described in an article by S. E. A. McCallan appearing in Contributions Boyce Thompson Institute, volume 15, pp. 91–117, 1948.

*Table 3.—Fungicidal activity of derivatives of alkyl aminomethyl Xanthic Acid*

A. DERIVATIVES OF DIMETHYLAMINOMETHYLXANTHIC ACID

| Number | Tomato Disease Test,[1] percent chem. giving 80% disease control | | Snap Rust Test,[2] percent chemical | | Seed Protectant Test [3] at 0.25% | |
|---|---|---|---|---|---|---|
| | E. B. | L. B. | .008 | .0016 | Peas | Corn |
| 1 | .006 | .004 | 3 | ---- | 96 | 80 |
| 2 | .0008 | .0015 | ---- | ---- | 96 | 76 |
| 3 | .0015 | .0015 | ---- | ---- | 86 | 83 |
| 4 | .025 | .004 | 8 | 19 | 90 | 63 |
| 5 | .006 | .003 | 13 | 19 | 76 | 30 |
| 6 | .002 | .0015 | 5 | 29 | 80 | 70 |
| 7 | .0015 | .001 | ---- | ---- | 96 | 70 |
| 8 | .001 | .003 | ---- | ---- | 100 | 76 |
| 9 | .006 | .004 | 1 | 5 | 53 | 53 |
| 10 | 0.2 | 0.2 | 6 | 29 | 46 | 30 |
| 11 | .005 | .003 | 1 | 14 | 93 | 83 |
| 12 | 0.1 | 0.04 | 4 | 46 | ---- | ---- |
| 13 | 0.01 | 0.01 | 0 | 2 | ---- | ---- |
| 14 | 0.2 | 0.0015 | 0 | 1 | ---- | ---- |

B. DERIVATIVES OF DIETHYLAMINOMETHYL XANTHIC ACID

| 15 | .030 | .005 | ---- | ---- | 73 | 70 |
|---|---|---|---|---|---|---|
| 16 | 0.01 | 0.008 | 12 | 40 | 50 | 30 |
| 17 | .030 | .020 | 100 | 100 | 70 | 40 |

C. DERIVATIVES OF DI-ISOPROPYLAMINOMETHYL XANTHIC ACID

| 18 | .008 | .010 | ---- | ---- | 53 | 6 |
|---|---|---|---|---|---|---|
| 19 | 0.03 | 0.02 | 21 | 100 | 50 | 23 |
| 20 | .030 | .020 | 22 | 56 | 36 | 20 |

D. COMMERCIAL FUNGICIDES FOR COMPARISON

| "Thiram" | ---- | ---- | ---- | ---- | 96 | 80 |
|---|---|---|---|---|---|---|
| "Ziram" | .0025 | .007 | 6 | 4 | 96 | 60 |
| "Ferbam" | .0150 | .015 | 2 | 5 | 73 | 73 |
| "Zineb" | .001 | .0004 | 0 | 0 | 66 | 45 |
| E. Untreated Control | ---- | ---- | 100 | 100 | 30 | 25 |

[1] Figures in these columns are derived from the curve fitted by eye to the data from at least three tests.
[2] Figures in these two columns are percent disease at the concentration of chemical shown.
[3] Figures are percentage germination (average of three replicates) for peas and corn respectively.
"Thiram"=Tetramethylthiuramdisulfide.
"Ziram"=Zinc dimethyldithiocarbamate.
"Ferbam"=Ferric dimethyldithiocarbamate.
"Zineb"=Zinc ethylenebisdithiocarbamate.

Field tests of the effectiveness of selected fungicides herein contemplated for the control of apple scab caused by the fugus *Venturia inaequalis* were conducted. Dwarf MacIntosh apple trees approximately five years old and growing in an orchard at Boyce Thompson Institute, Yonkers, New York, were sprayed eight times at approximately ten day intervals with the chemicals listed in Table 4. The first spray was applied on May 9 at which time the trees were in full bloom and the last on July 22 when the trees had full foliage. The intervening spray dates were May 16, May 27, June 2, June 18, June 25, and July 11. The equipment used was a power sprayer which applied the fungicides at 80 p. s. i. pressure at the nozzle. Jet-agitation was provided by a by-pass valve.

The formulation of these chemicals into a physical state suitable for application in commercial spray equipment was easily accomplished giving further indication of the convenience and usefulness of these compounds. Materials Nos. 4, 6, 7, and 8 were formulated as follows:

Eighty parts by weight of pure chemical were mixed with 19 parts by weight of Silene E. F. (a finely-divided calcium silicate used as a diluent) and 1 part of "Tergitol" dispersant NPX (a non-ionic emulsifier-dispersant which is an alkyl phenyl polyethylene glycol ether). These ingredients were blended and then micronized. The resulting formulations were free-flowing wettable powders readily dispersed in the spray tank. Other proportions of chemical and diluent may be used satisfactorily but the 80/19 ratio was selected for convenience.

Material No. 3 and another formulation of material No. 4 were prepared as tank mixes by mixing in the spray tank, immediately before use, sodium dimethylaminomethyl xanthate and a soluble salt of the respective metal, in this case ferric sulfate, and manganese sulfate, respectively. Both of these ingredients are water soluble but the metal xanthate, being insoluble, is precipitated as a flocculent solid when the two are mixed. Fungicides prepared in this manner are shown to be as effective as the corresponding wettable-powder formulations of the fungicides and have the advantage of being less expensive although they are not as convenient for the consumer to use. However, the facility with which tank mixes can be prepared from the fungicides herein contemplated is a further illustration of the versatility and usefulness of these compounds.

The effectiveness of the treatments was assessed by counting not less than 400 leaves on each of the five replicate trees receiving the same treatment. A leaf was considered scabby if it had one or more scab lesions. The percentage of scabby leaves based on the total number examined was recorded. The results recorded on two different dates are shown in Table 4.

Table 4.—*Efficacy of selected dialkyl aminomethyl xanthate against apple scab* [1]

| Number | Percent Scabby Leaves | |
|---|---|---|
| | June 3 | June 24 |
| 4 | 9 | 14 |
| 4 [2] | 7 | 19 |
| 3 [3] | 11 | 21 |
| 6 | 9 | 19 |
| 7 | 6 | 21 |
| 8 | 9 | 19 |
| Unsprayed | 69 | 80 |

[1] All compounds were tested at the rate of 2 lbs. active ingredient per 100 gallons of water.
[2] Prepared by mixing in the spray tank just prior to application, sodium methyl aminomethyl xanthate ([1]) and ferric sulfate.
[3] Prepared as above from ([1]) and manganese sulfate.

A field test of the effectiveness of selected fungicides contemplated herein for the control of fungus diseases of celery was conducted in Florida. Seedlings of variety Supreme Golden were transplanted to field plots December 11. Fifteen applications of chemical were applied at weekly intervals as follows: December 17, 24, 31; January 6, 13, 19, 24, 28; February 4, 11, 18, 25; March 4, 11 and 17. Material Nos. 2 and 5 used in this test were prepared and used as tank mixes in the manner previously described. The principal disease encountered was Cercospora leaf spot caused by the fungus *Cercospora apii*. Estimates of the percentage damage to the crop were made by competent observers and yield data were taken as the weight of the bunches after stripping off diseased stalks. The final estimate of crop damage was taken on March 30 and is shown under the heading "Average Disease Rating" in Table 5. The yield in pounds of celery cut to 16″ and stripped of blighted leaves is recorded in Table 5 under the heading "Average Yield." Each figure in this table is the average of five replicates.

Table 5.—*Efficacy of selected dialkylaminomethyl xanthates against celery blight*

| Number | Average Disease Rating, Dosage | | | Average Yield, Dosage | | |
|---|---|---|---|---|---|---|
| | 1 | 2 | 3 | 1 | 2 | 3 |
| 2 | 3.0 | 6.5 | 8.7 | 131 | 137 | 134 |
| 5 | 1.0 | 2.0 | 5.0 | 113 | 124 | 119 |
| Unsprayed Check | | 45.0 | | | 89 | |

Compounds:
  2—zinc dimethylaminomethyl xanthate prepared by mixing in the spray tank just prior to spraying sodium dimethylaminomethyl xanthate (1) and zinc sulfate.
  5—cupric dimethylaminomethyl xanthate prepared as above from 1 and copper sulfate.
Dosages:
  1=2 lbs. active ingredient/100 gallons water.
  2=1 lb. active ingredient/100 gallons water.
  3=½ lb. active ingredient/100 gallons water.

Mammalian tests on the solid, water soluble material No. 1 showed that it is not irritating to rabbit skin or eyes as a 5% aqueous solution and the dry powder does not injure rabbit eyes. By skin penetration the LD50 is estimated to be above 2.0 gm./kg.

From the data presented herein it will be seen that the metal and alkylamine salts, esters and sulfides of the alkylaminomethylxanthic acids are effective fungicides. They are also selective and have a margin of safety in that as used they do not burn or injure the foliage of the host plant or the seed at concentrations necessary to control the fungus. The materials are also stable in that they resist weathering which includes decomposition by ultra-violet light, oxidation or hydrolysis in the presence of moisture or, at least, such decomposition, oxidation and hydrolysis as materially decreases the desirable characteristics of the toxicant, for instance, fungicidal action, or imparts undesirable characteristics, for instance phytotoxicity. These xanthic acid derivatives are also compatible with other constituents of the spray schedule, in particular, insecticides. In the treatment of seeds and of soil in which plants are growing or will be grown, the materials contemplated herein do not injure the seed nor prevent its germination nor injure the roots yet they inhibit the development of parasitic fungi and are stable.

The materials contemplated herein may be used with or without "addends," for instance insecticides, for instance rotenone, DDT or nicotine sulfate; or those addends which cause the fungicides to adhere evenly and strongly to seeds, for instance methyl cellulose; or extending materials or diluents which facilitate the measuring of and the application of the small amounts of the active materials which are desirable to inhibit the fungi, for instance clays, diatomaceous earths, siliceous materials and the like, finely ground. These adjuvants are pulverized, water-insoluble adhesive and extending agents and are non-phytotoxic.

In the matter of additive materials, the compositions are preferably free or substantially free of such materials which retain the toxicants to such an extent that an effectively fungicidal aqueous solution or suspension of the toxicants cannot form. If the adjuvant or additive preferenally holds the toxicants against water a very large proportions of the toxicant must be used to make it available to the spore. Due to the large number of adjuvants and additives which may be used with the toxicants, examples of all of these and of the proportions thereof to the toxicant cannot be given but the laws relating to such proportions are relatively simple. It should be understood that a fungus spore does not germinate except in the presence of water and that such germination is a necessary preliminary to the infection of the plant or seed. The opportunity for a spore to germinate occurs when a water-base spray is applied to those parts of the plant which are above the ground and after each rain and when dew forms, or, in the case of a seed at any time after the seed is planted, due to the water in the ground, irrespective of whether the earth has been subjected to rain, irrigation, or other application of water; but these are also the conditions under which the inhibitive solutions of the toxicant are formed. Adjuvants of the loss-preventing type which mechanically or physically hold the undissolved toxicant of the aqueous spray composition, or the aqueous composition which is formed from the water of the earth and absorb or adsorb but do not preferentially dissolve the toxicant in the aqueous compositions as against water, are the preferred adjuvants. For foliage use, after the spray composition has been applied and has dried, upon the next rain such adjuvants release sufficient of the toxicant to the rain water on the foliage to form an aqueous solution of rain water and toxicant which spreads the toxicant over the foliage and leaves a deposit of the toxicant when the water evaporates as was the case when the original spray dried after application. In the case of planted seeds, moisture is continually present and the fungus inhibiting aqueous solution must be present at all times.

It has been found that the toxicants contemplated herein are not deleteriously affected by suitable adjuvants and additives, for instance the aforesaid insecticides; or suitably ground diluents, for instance talc, calcium silicate, clays, earths and the like; or wetting and dispersing agents for instance the non-ionic alkyl aryl polyalkylene glycol ethers or polyalkylene oxide ethers now on the market; nor are the fungistatic and phytotoxic properties of the toxicants adversely affected by such agents. It is a feature of the invention that the toxicants contemplated herein are so chemically inert that they do not react with the various agents, nor do they react chemically with the foliage or other parts of the plant, either with or without the additive agents, in a deleterious manner.

Where the fungicides are used to inhibit fungi in seed treatments, they are preferably applied to the seeds as a dust, preferably with an adhesive adjuvant, merely being tumbled with the seeds. Where the toxicant is a liquid sufficient talc or other absorptive solid extender is preferably used to absorb the toxicant and give a free-flowing powder.

Adjuvants and other components of the spray compositions may be added at any time, that is, prior to, simultaneously with or after the mixing of the toxicant and water. It is generally preferred, where water-insoluble adjuvants and other water-insoluble materials are components of the spray composition, to grind or otherwise disperse the insoluble components in a portion of the water until the insoluble components are in a state of fine subdivision and then to incorporate this mixture into the remainder of the water component which may or may not already contain the toxicant.

As used in the field tests where the toxicants are the sole inhibiting agent, the spray compositions contain more of the toxicants than are necessary to give an LD 50 value. Field sprays may contain from about one-half pound to 8 pounds of the toxicants per 100 gallons (about 834 pounds) of water. Satisfactory sprays for general use contain between about one-half pound and 3 pounds of the toxicants per 100 gallons of water. Where the toxicant is of low water solubility, the spray compositions preferably contain so much of the toxicants that they are in the form of slurries or suspensions. The slurries comprise dissolved as well as undissolved (solid) toxicant or toxicant absorbed by the adjuvant so that when the spray dries there is not only the toxicant which is deposited from the solution by the evaporation of the water but also the surplus toxicant which acts as a reserve, ready to dissolve and spread over the plant in case of rain. The toxicants contemplated herein have such low phytotoxic activity and such high fungistatic activity that when used as suspensions containing undissolved toxicant they inhibit the fungus yet do not injure the host plant.

Although the fungicides may be used with addends a feature of the invention is that the fungicides contemplated herein generally remain in place on the plant or on the seed very well without the use of added "stickers" to promote adhesion. However, when dusting on plants or on seeds, the dusting composition preferably comprises a very large proportion of cheap added material, for instance talcs or clays, acting as diluents or extenders, as the fungicides are so effective that an exceedingly small amount is required on any area for inhibitive purposes. Bentonite is a combined extender and adhesive but any other suitable extender or adhesive or combined adhesive and extender may be used.

From a practical point of view the manufacturer must supply the orchardist with a low cost concentrate or spray-base in such form that merely by mixing with water and other low cost materials readily available to the orchardist at the point of use, he will have an easily prepared spray, in the present case of xanthates. To be practical, the base composition or concentrate should be entirely or substantially homogeneous as packaged, easily removed from the container, easily measured with primitive equipment, capable of being dispersed in water easily and quickly, free of foaming difficulties when agitated with water, stable physically at least over the extreme range of atmospheric temperatures, chemically stable to retain potency over an extended storage period and yield a spray composition, when mixed with water, having the toxicant in a form most toxic to fungi, yet non-phytotoxic to plants in foliage. It is contemplated that the orchardist may also mix with the base or the spray such special additives, for instance arsenates, the various rotenone and nicotine products, the various carbamates, DDT, and the like, as his particular spray schedule may require. The xanthates contemplated herein work well with these various addends, being compatible and non-reactive with them to yield sprays which are effective yet not too phytotoxic.

For general agricultural use, it is preferred to package the materials as wettable powders containing a finely-divided solid extender or filler. Compositions of the following formula have been found satisfactory for general use:

|  | Parts by weight |
|---|---|
| Active material | 80 |
| Solid diluent | 19 |
| Wetting agent | 1 |

In this formula for general use the solid extender, filler or diluent is desirably a material which is very finely divided and of low specific gravity and can act as a suspending agent in aqueous compositions, for instance, diatomaceous earth as distinguished from sand which has a high specific gravity and a strong tendency to settle out of an aqueous spray composition. Suitable diatomaceous earths are marketed under the proprietary name "Celite," grades "209" and "400" giving satisfactory results. Where the toxicant is a liquid sufficient solid extender is preferably used to absorb the toxicant and give a free-flowing powder.

The wetting agent is preferably non-ionic; and substantially any surface active agent of this type is satisfactory. These materials may be organic acid derivatives of alcohols, including polyhydroxy alcohols, as glycols, for instance the higher fatty acid esters of the polyethylene glycols, or water-soluble products which are higher alkaryl ethers of polyethylene glycol which may be made by reacting a higher alkyl phenol with ethylene oxide.

The agriculturist may use the unextended active material or a composition of the above formula in combination with water as an aqueous spray or for dusting on the parts of a plant which are above the ground or for mixing with seed; as it is difficult to spread such a small amount of material evenly over the plant, the agriculturist will normally extend the material with more solid or liquid extender. A composition containing both the solid extender and the wetting agent is adapted for further extension with either a solid or a liquid extender. Where the active material is to be applied in a dry condition, for instance to seed or as a dust on plants, it, or a composition of the above formula or a composition of the above formula omitting the wetting agent, may be mixed with any dry extender in any proportion and applied.

Where the active material is to be applied as an aqueous spray, it may be mixed into water containing substantially any non-ionic wetting agent, or a composition of the above formula, or a composition of the above formula omitting the solid diluent, and containing from about 0.1 part to 10 parts of wetting agent per 100 parts of active material may be mixed with water. Also, where water is to be the extending agent, the active material may be packaged directly after formation and without drying, with or without the wetting agent.

The previous composition formula is for a concentrate containing a high percentage of active material with sufficient diatomaceous earth to render the active material easily distributable on seeds or in additional amounts of dry extenders and easily suspensible in water even with the small amount of wetting agent given. For 80 parts of active material the solid suspending agent may run from 19 to 1500 parts and the wetting agent from 0 to 5 parts. For aqueous sprays, water may run from 20 to 200 gallons per pound of active material. Such aqueous sprays are used in an amount sufficient to wet the plant.

If desired, the fungicides may be applied as dusts, either to the field or to the seed. For dusting, the dusts should include sufficient of the fungicide to give the heretofore-stated amounts and the remainder of the dust may be any of the usual inert carriers or any other desired toxicant, for instance arsenate of lead or benzene hexachloride or other insecticide. The amount of toxicant, per 100 pounds of seed, may be from 0.1 to 0.5 pound.

In whatever manner the fungicides are applied, they are preferably applied as very finely-divided particulate materials either as dusts for use on seeds or plants or as aqueous suspensions on plants, the more finely-divided the materials are, the better they are distributed and the greater their adherence to the plant or seed. Highly water soluble materials are preferably applied with absorbent particulate extenders when used in aqueous sprays. Such extenders are also used where the aqueous spray is so dilute that even the relatively insoluble toxicants are dissolved.

The distribution of the materials may be by any suitable apparatus. For application to seed, the materials are tumbled with the seed in a barrel or otherwise mixed; for application to plants, sprayers or dusters or an airplane may be used. As the materials have little or no phytotoxic effects, crop plants in the treated field and crop plants in adjoining fields onto which the materials may drift, are not harmed.

As will be understood from the foregoing description, the materials disclosed herein as operative are non-phytotoxic fungicides and are surprisingly potent and, for the majority of the toxicants, because of substantial insolubility in water are long lasting and enduring. In any case, in the presence of water, either the water which is in the earth when the materials are used in association with seed, or rain or dew or the water of guttation when the fungicides are used on plants, the active materials are sufficiently soluble to produce a fungicidal coating on either the seed or plant.

The fungicides disclosed herein exhibit a correlation of four factors which enable them to be useful and practical as either foliage or seed fungicides, namely sufficiently high fungicidal action, sufficiently low phytotoxic action, sufficiently low overall solubility to retain their effectiveness on the plant during normal weathering conditions between sprays but a sufficiently high rate of solution quickly to form a fungicidal solution which spreads over the plant and inhibits the germination of the fungus spores. The solid fungicide, that is the solid of the slurry or of the dust which is undissolved in the water of the slurry or undissolved in the water of rain, dew or plant guttation, provides a reserve of fungicide in situ on the plant, readily at hand to form quickly a sufficiently concentrated solution of the toxicant to be fungicidal with the water remaining on the plant after a rain or with water from dew or plant guttation, or from water in the earth. This solution will be of the correct concentration to deposit on the plant or on the seed or on the roots, a film of fungicide which is fungicidal yet not too phytotoxic. Also, as the fungicides are so relatively insoluble, the usual shower does not dissolve and carry away any great amount of the fungicide nor does water seeping through the earth. Thus the fungicides contemplated herein provide a relatively long-lasting pest control which does not injure the plant or the seed when freshly applied nor, due to the stability of the fungicide, thereafter. The fungicides are effective plant and seed fungicides and have such low phytotoxic characteristics that they are not significantly injurious to plant foliage or seed or roots either during application directly or by means of suitable compositions, or immediately after application or throughout the period of contact with the plant, seed or roots.

Apart from the distinctive fungicidal properties of the materials herein disclosed, adapting them to agricultural uses, the materials generally may be used as modifying agents in the paper and rubber industries, and they may find applications in the pharmaceutical arts either as drugs or intermediates.

What is claimed is:

1. A compound of the formula

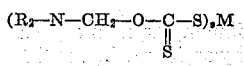

where: M is a member of the group consisting of metals of Groups I, II, III, IV, VII and VIII of the periodic table, lower-alkylamine radicals, a radical of the formula

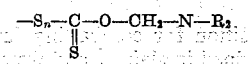

a radical of the formula

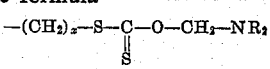

$v$ is an integer not greater than the valence of M; $n$ and $x$ are from 1 to 3 inclusive; R is a lower alkyl radical.

2. A compound of the formula

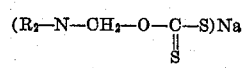

wherein R is a lower alkyl radical

3. A compound of the formula

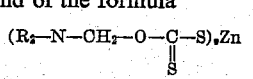

wherein R is a lower alkyl radical and $v$ is an integer not greater than 2.

4. A compound of the formula

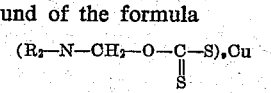

wherein R is a lower alkyl radical and $v$ is an integer not greater than 2.

5. A compound of the formula

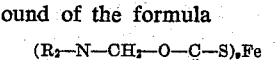

wherein R is a lower alkyl radical and $v$ is an integer not greater than 3.

6. A compound of the formula

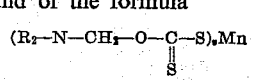

wherein R is a lower alkyl radical and $v$ is an integer not greater than 2.

7. A compound of the formula

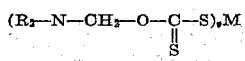

wherein M is a lower alkyl amine radical, R is a lower alkyl radical and $v$ is an integer not greater than the valence of M.

8. A compound of the formula

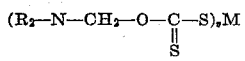

wherein M is a radical of the formula

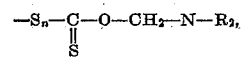

R is a lower alkyl radical, $v$ is an integer not greater than the valence of M and $n$ is an integer from 1 to 3 inclusive 9. A compound of the formula

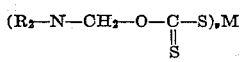

wherein M is a radical of the formula

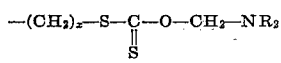

R is a lower alkyl radical, $v$ is an integer not greater than the valence of M and $x$ is an integer from 1 to 3 inclusive.

10. Sodium dimethylaminomethylxanthate.
11. Bis(dimethylaminomethylxanthogen) trisulfide.
12. Bis(dimethylaminomethylxanthogen) tetrasulfide.
13. Dimethylamine dimethylaminomethylxanthate.
14. Dimethylaminomethyl dimethylaminomethylxanthate.
15. A composition for combatting fungi containing a compound as defined in claim 1 and water as a fungicidal adjuvant carrier therefor.

16. A composition for combatting plant fungi containing a compound as defined in claim 1 and a powder as a fungicidal adjuvant carrier therefor.

17. A composition for combatting fungi containing a compound as defined in claim 1 and a non-ionic wetting agent as a fungicidal adjuvant.

18. Method of combatting fungi which comprises applying to the host a compound as defined in claim 1.

19. Method of combatting soil and seed borne fungi which comprises applying to the soil a compound as defined in claim 1.

20. A concentrate adapted to be made into a spray for combatting fungi by the addition of water comprising a compound as defined in claim 1 and a non-ionic wetting agent as a fungicidal adjuvant in the proportion from about 0.1 part to 10 parts of wetting agent per 100 parts of active fungicide.

21. A concentrate adapted to be made into a spray for combatting fungi by the addition of water comprising a compound as defined in claim 1 and a non-ionic wetting agent as a fungicidal adjuvant in sufficient solvent to maintain the concentrate in a liquid condition.

22. A composition for combatting fungi containing at least 1 percent of a compound as defined in claim 1 and water as a fungicidal adjuvant carrier, therefor.

23. A composition for combatting plant fungi containing at least 1 percent of a compound as defined in claim 1 and a powder as a fungicidal adjuvant carrier, therefor.

24. A composition for combatting fungi containing at least 1 percent of a compound as defined in claim 1 and a non-ionic wetting agent as a fungicidal adjuvant.

References Cited in the file of this patent

UNITED STATES PATENTS

| | | |
|---|---|---|
| 2,173,384 | Carter | Sept. 19, 1939 |
| 2,234,031 | Wenning | Mar. 4, 1941 |
| 2,325,720 | Ubschot et al. | Aug. 3, 1943 |
| 2,562,011 | Baumgartner | July 24, 1951 |
| 2,663,291 | Fischback | Jan. 5, 1954 |